March 10, 1931.  C. B. BUERGER  1,796,138
PROCESS OF AND APPARATUS FOR TREATING OILS
Filed Feb. 23, 1923   4 Sheets-Sheet 1
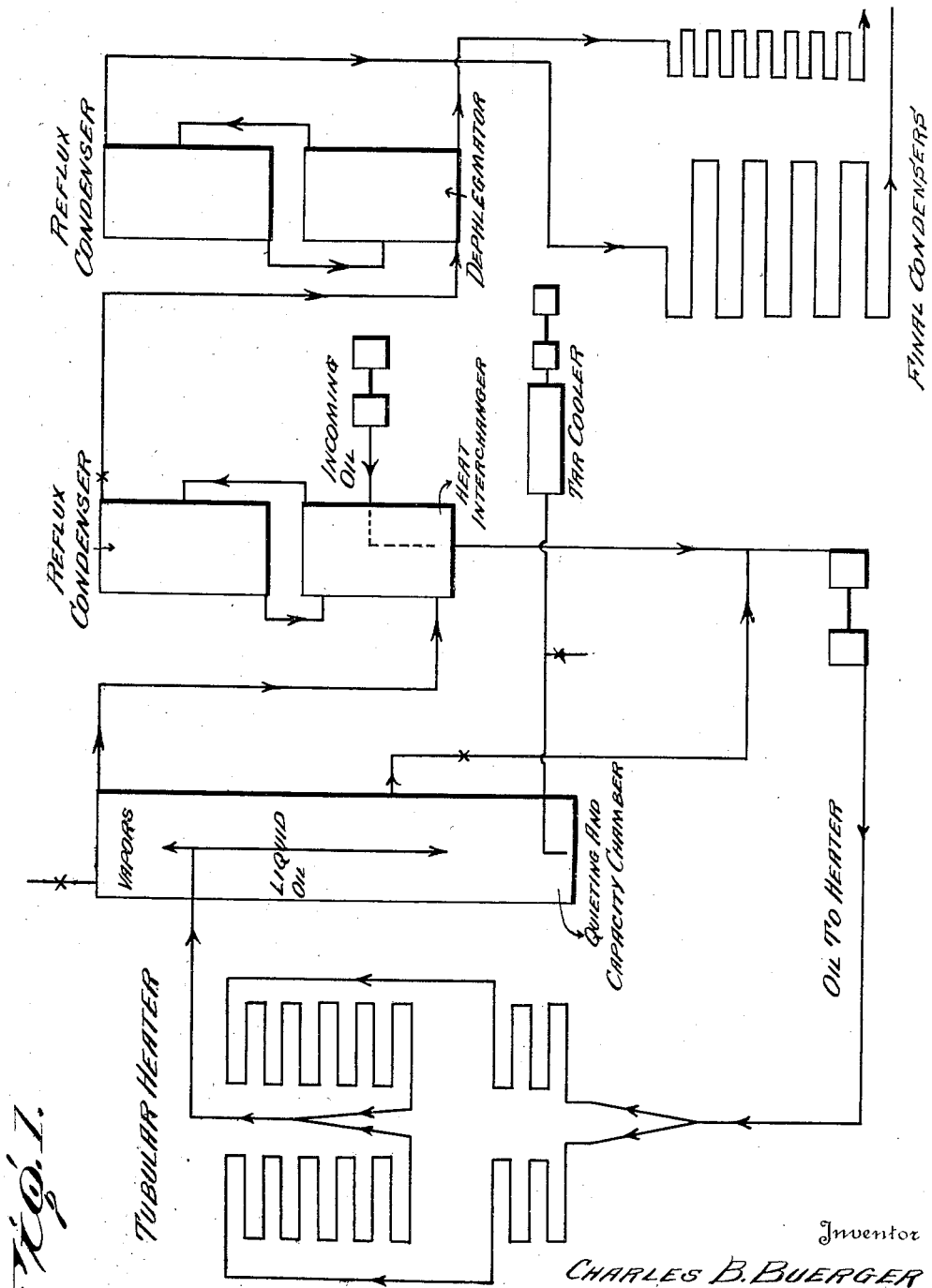

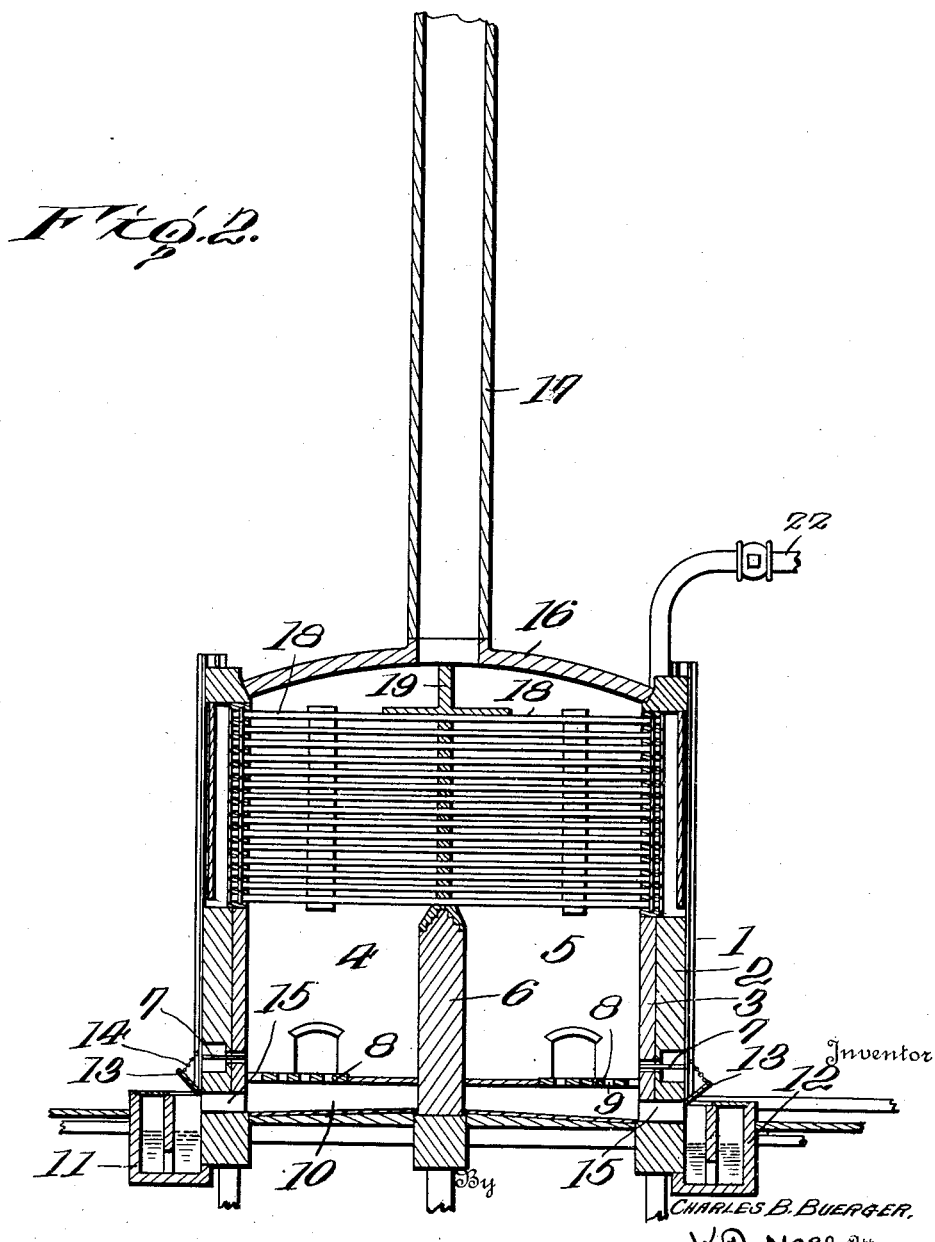

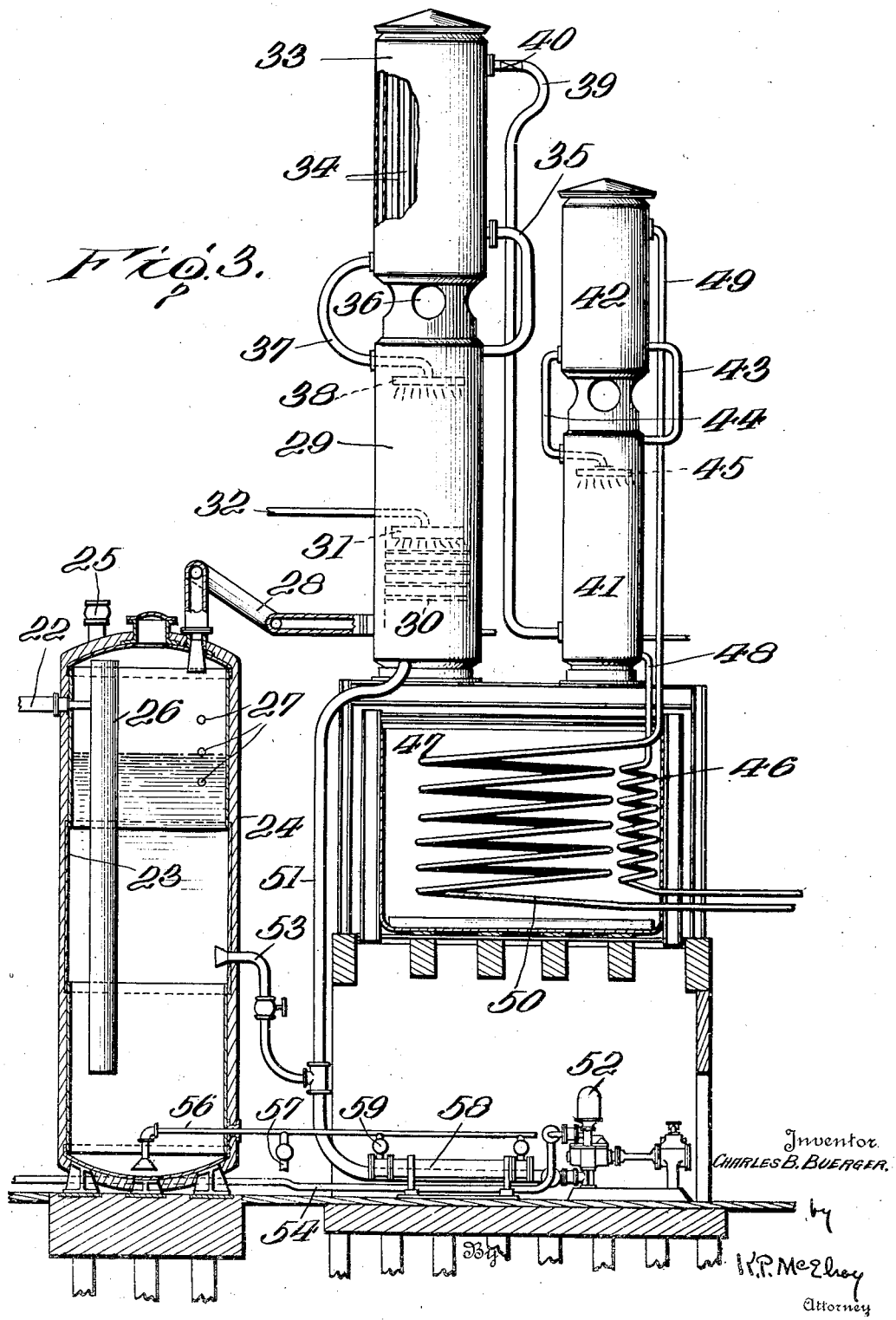

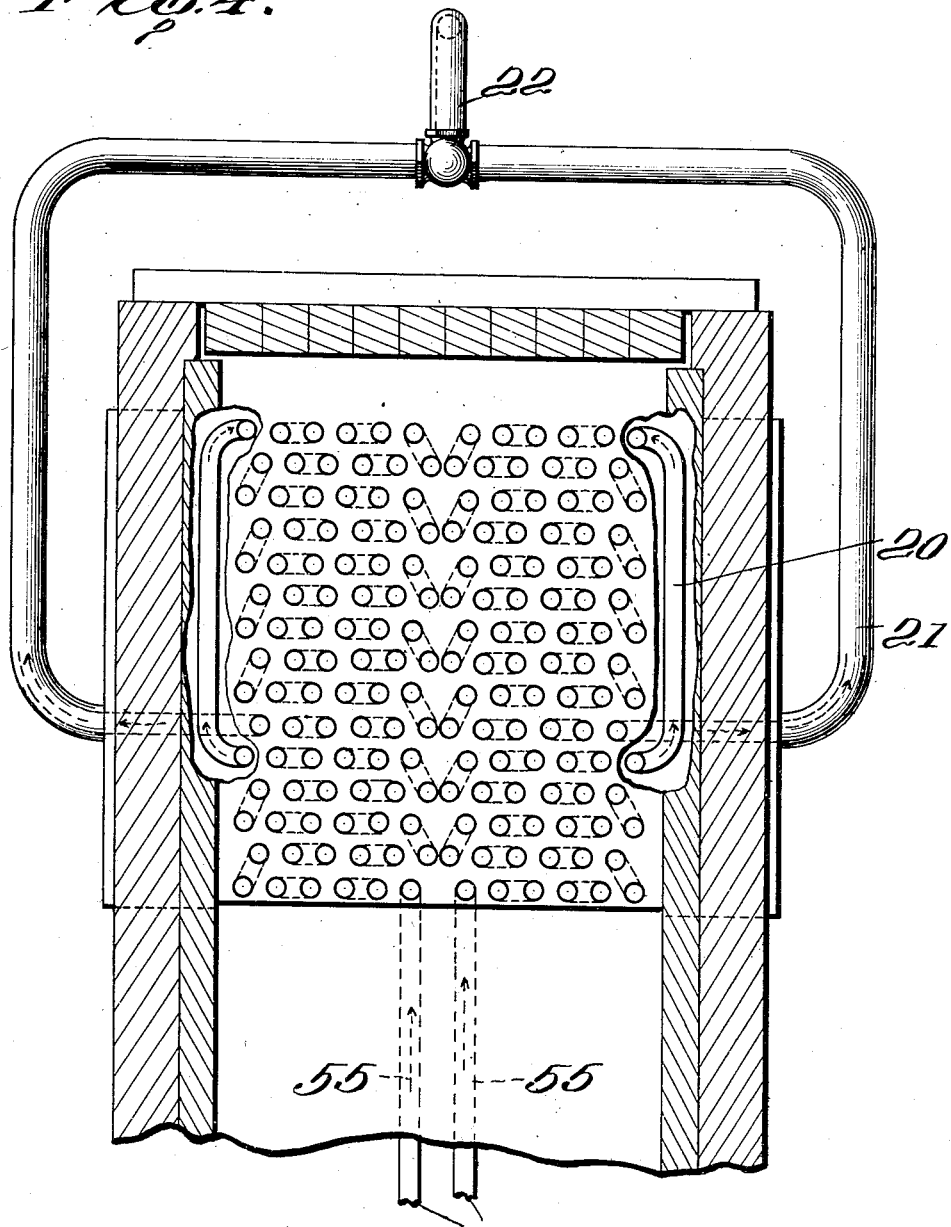

Patented Mar. 10, 1931

1,796,138

UNITED STATES PATENT OFFICE

CHARLES B. BUERGER, OF PITTSBURGH, PENNSYLVANIA, ASSIGNOR TO GULF REFINING COMPANY, OF PITTSBURGH, PENNSYLVANIA, A CORPORATION OF TEXAS

PROCESS OF AND APPARATUS FOR TREATING OILS

Application filed February 23, 1923. Serial No. 620,797.

This invention relates to processes of and apparatus for treating oils; and it has for its objects, among other things, cracking oil by heat in such manner as to utilize to a high degree the heat of generated vapors for heating incoming oil, to recirculate through the heating elements a large amount of residual oil with the incoming oil as well as condensed vapors, to provide a time element for maximum cracking of the oil in the operation, to provide for settlement and removal of heavy residual oils, tar and carbon with selective recirculation of the lighter oil, to provide for continuous operation and to operate under such conditions that deposit of carbon is minimized in the direct heating elements, but is provided for at another point under conditions allowing ready removal thereof.

It is another object of the present invention to provide a cracking apparatus operating upon oil in the liquid state and capable of large capacity rate or daily output and of convenient operation, such operation being susceptible of control so as to give a maximum yield of light oils and a minimum production of coke and gas.

Petroleum oils, like all other bodies containing carbon and hydrogen, when exposed to a high temperature undergo "destructive distillation"; that is, they break up with the production of gases and vapors and a residue rich in carbon, and a portion of the residue may be carbon itself in the form of coke. For many years, destructive distillation or "cracking", as it is termed in the art, has been used for the purpose of producing lighter products of the nature of gasoline and kerosene from heavier oils of less commercial value. Sometimes, the oils are heated or superheated in the liquid state for the purpose of breaking them up and sometimes the vapors are so treated. In cracking liquid oils it is in general necessary to use pressure to retain them in the liquid form, as the oils mostly used for cracking, known in the trade as gas oil, solar oil and the like, boil between 500° F. and 700° F., while the temperature used for cracking is 700° F. or higher. Sometimes the pressure used in the still is allowed to extend through the condenser which gives a larger direct yield of light products because of the greater scrubbing action of the condensates in contact with gases and vapors under pressure. There is less loss of light oils as vapors going forward with uncondensed gases. The procedure, however, also has its inconvenience, since the oils coming from the condenser are charged with considerable gas; and upon release of pressure, this gas escapes taking with it more or less light products. The condensate is "wild". In cracking, the original oil gives a varying yield of lighter products, naphtha, kerosene and gasoline, recovered in the condenser; uncondensable gases and vapors passing the condenser and generally used for heating purposes and a residue of heavy oil. There is also always more or less coke or carbon produced. In the operation, the effort is, of course, to obtain a maximum yield of the lightest liquid products with as little coke and gas as may be.

In one way of looking at the operation of cracking oils in the liquid state, it is an evaporation operation: oils being boiled off as vapors from a body of oil with the usual large demand for heat units incident to any vaporization. The operation is not, of course, altogether a simple evaporation, as regard must be taken of the properties of liquids evaporating under pressure, of the chemical actions involved, and so on, and in particular, of the formation of coke and carbonization products which tend to clog the heating surfaces, but in a general way, it is analogous to distillation. I therefore arrange my apparatus so as to provide an economical delivery of the necessary heat units to the oil while providing also against clogging by solid or tarry products. Coke and tar once formed on or adhering to a heating surface tend to bake on and form dense hard layers. In my arrangement, the oil is circulated through tubular elements at a relatively high velocity; and so that the incoming oil first traverses the tubes located in the hottest part of the furnace; thereafter traversing tubes exposed to fire gases at reduced temperatures. The demand for heat units is the greatest in the first period of passage of the oil through the heating elements and there is then the least tendency to the deposition of carbon. Later, after cracking begins, there is a greater tendency for deposition of carbon and at this time the oil traverses tubes in a portion of the furnace of less temperature. No effort is made to secure a maximum cracking effect on the oil so circulated. On the contrary, I purposely restrict the cracking effect so that most of the original oil goes on uncracked, separate gases, vapors and carbon from it and re-circulate the remaining oil.

According to my invention, I establish and maintain a major body of quiescent oil under heat and pressure, the temperature being sufficient to produce cracking therein and this body of oil being hotter at its upper levels than at its lower levels. I circulate a minor flow of oil from and back to said body by tapping off at one point and returning at another point, the circulation being through heating elements, such as tubes or the like, maintained at a relatively higher temperature than the major body of oil. The return flow from the heating system is arranged so as not to disturb substantially the quiescence of the major body of oil and the flow through the heating elements is sufficiently rapid to allow only a minor amount of cracking occurring during the time required in such flow, the major amount of cracking occurring in the larger body of oil. The circulation is produced by a suitable pump and the pressure in the tubular heating system is therefore higher than that prevailing in the container for the major body of oil into which the tubular system discharges, the pressure differential being greater at the intake end than at the discharge end of the tubular system. With rapid circulation the pressure differential at the intake end is heightened. The highest pressures in the whole apparatus obtain in the tubes exposed to the highest temperature. The major body of oil can be, and is, maintained at the cracking temperature for the time requisite for the most effective action without reference to the time occupied by the oil in transit through the hot tubes; a time which is necessarily (and advantageously) brief. As stated, I contemplate a rapid circulation through the tubes.

Petroleum hydrocarbons to be cracked are heated, preferably in the form of traveling streams, to cracking temperature and under pressure, but, as stated, the rate of travel is such that the oil is delivered from the heating elements before any great amount of cracking has taken place. The non-vaporized hydrocarbons from the heating elements are delivered into and below the level of a confined body of oil and any vapors are delivered above the level of such body, this being done under conditions allowing the said body to remain relatively quiescent. The body of oil is confined under conditions preventing any substantial loss of heat units and there is a vapor space above this confined body of oil, and as cracking takes place, the vapors from this body of oil, together with any vapor coming from the heating elements, are passed to a heat interchanger. In this heat interchanger, these vapors are scrubbed with fresh incoming oil of the character of that delivered to the heating elements and this incoming oil, together with condensate from the vapors which have been scrubbed by it, is delivered by means of a pump or the like to the heating means, together with a portion of the oil from a relatively low point of the said quiescent body. The vapors coming from the heat interchanger are passed to a reflux condenser and the condensate from this reflux condenser is passed to the heat interchanger. This condensate from the reflux condenser assists in scrubbing and cooling the vapors in the heat interchanger and the condensate, together with the incoming oil, is fed to the heating means. The vapors from the reflux condenser are then passed through pressure releasing means and are brought down to atmospheric pressure. Then these vapors are passed through a second interchanging element and thence to a reflux condenser, the condensate from the last mentioned reflux condenser passing to and through the interchanging element. The condensates from the two are then passed to cooling coils, while the vapors passing to exit from the reflux condenser are separately condensed in cooling coils or the like. During this time, either continuously or intermittently, the heavier underlying oil in the quiescent body and the tar and coke or carbon which have settled at the bottom thereof, are withdrawn and, usually, sent through a tar cooler. Ordinarily, I seek to adjust conditions so that any given portion of oil is exposed to a cracking temperature for about eight hours; and I find it advantageous to make the amount of oil circulated, that is going through the tubular heating system in a given time about twice the amount of oil entering the system as replenishing oil in the same space of time. In so doing, the amount of oils returning to the cracking system from the heat exchanger and the reflux condenser as a result of scrubbing and heat interchange actions is usually about equal to the amount of replenishing oil introduced. In other words, the amount in circulation in the heating tubes at any given time is about equal to the total of the replenishing oil and of the returned or refluxed oils coming back to the cracking system at the same time; and I am able to secure a high velocity in the cracking tubes without increasing the amount of reflux unreasonably, with acceleration of the cracking action in the major body of oil and easy maintenance of cracking temperatures in such body. The invention comprises also certain details of construction and methods of operation resulting in economical cracking and distillation and in a maximum yield of lower boiling hydrocarbons, as more fully hereinafter set forth and as claimed.

Referring to the drawings,

Fig. 1 is a view in elevation showing a complete installation under the present invention;

Fig. 2 is a diagrammatic vertical sectional view through the tubular heater;

Fig. 3 is a view partly in section and partly in elevation, showing the intermediate settling chamber, heat interchanger tower, fractionating reflux tower, and condensers; and Fig. 4 is a diagrammatic vertical section through the tubular heater of Fig. 2 at right angles to the view of Fig. 2, illustrating the course of the oil through the tubes.

Referring to the drawings and first to Fig. 2, element 1 indicates structural steel work of an oil heating furnace supporting the brick wall 2 lined with fire brick 3. The furnace is divided into two combustion chambers 4 and 5 by bridge wall 6 and each combustion chamber is individually heated, as shown, by means of oil or oil and gas burner 7. The bottom floors 8 of the combustion chambers are provided with checkered fire brick, or are otherwise perforated, as shown, at 9, so that in event of any of the tubes (hereinafter described) breaking or leaking, the oil drains out of the fire chamber and can be collected under its floor by conduit 10 and sent via traps 11 and line 12 to a point of safe collection. Air for combustion normally enters through these perforations in the floor. In case of fire, the doors 13 are dropped, preferably automatically by a fusible link, as shown, at 14, closing air ports 15, and firing is discontinued. The roof 16 of the furnace is provided with a stack 17 for waste gases. Mounted within the combustion chambers are the heating tubes 18 arranged in a number of horizontal tiers. As shown (see Fig. 4), there are two sets of these tube tiers, operating in parallel; the tubes of each tier however extending across both heating chambers and through their dividing wall 19 (see Fig. 2). The number of such tube series which it is desirable to use in parallel will depend upon the size and capacity of the unit, and the size of the tubes used, and is selected so as to give the desired velocity of oil in the tubes together with the desired pressure loss in traversing the tubes. As shown in Fig. 4, the oil reaches the tube tiers from pump or pumps, to be hereinafter described, and flows first through the bottom tube tier of each set upwardly to the next tier, thence to the next tier, and so on up to the fifth tier, and thence out through a line 20. Any number of these heating tube tiers may be employed and in any arrangement; but I find it advantageous to send the oil first through five tiers, or thereabouts, in a general upward direction, that is, in the direction of the flow of the flame gases and then by-pass the oil to the top tier of a similar assemblage of tiers, and thence downward through these tiers. As shown, the pipe 20, instead of leading directly outwardly and away from the furnace, serves as a by-pass leading the heated oil to the top tier, whence it flows downwardly through successive tiers. As shown, there are ten of these tiers arranged for downward flow. From the last tier in series, oil goes to exit through pipe 21. The oil flowing through pipes 21 goes to common collecting main 22. This line 22 leads to a settling chamber where vapors and liquids are separated and settling takes place.

Adjacent the furnace is located the settling chamber 23 (see Fig. 3) preferably built of sections of steel, suitably heat insulated as shown at 24, and provided with safety valve 25 at the top, leading to a place of disposition of oil vapors (not shown). Line 22 connects to quieting pipe 26 open at both ends and terminating at its lower end at a point a distance above the bottom of the chamber and below the normal level of the oil therein and at its upper end a distance above the normal level of the oil. The level of the oil may be ascertained from time to time by opening one of the try-cocks 27. Leading from the chamber is the heat insulated vapor line 28 in communication with the lower part of tower 29. This tower has heat exchanging and scrubbing functions. As the vapors leave the intermediate chamber they are quite hot, carrying heat which can be usefully regained and they also carry more or less vapor of heavy oil. By producing a flow of oil through the tower, both heat and heavy vapors are taken up by this oil. This tower is provided with some sort of packing or film-forming devices, here shown as a plurality of grates or tiles or the like 30 and with a distributor 31 receiving incoming replenishing oil from pipe 32 as hereinafter described. Surmounting the tower is reflux condenser 33 which may, as shown, consist of a number of tubes 34 air cooled interiorly, around which the vapor from the heat-exchanging tower 29 ascends these vapors leaving said tower at a high point through line 35. Air enters the casing surrounding the tubes through louvre 36. The condensate in the reflux condenser is returned to the tower 29 by means of line 37 leading from a low point of this condenser to a high point in the tower and to a distributor 38 therein. The condensate delivered to the tower 29 by distributor 38 comes into contact with the vapors which have passed the grates or tiles 30, abstracting further heat and high boiling oils therefrom. The condensate from 33 and the incoming oil from 32 are stripped of any contained low boiling oils in their downward passage through heat exchanger 29. Vapors leaving reflux condenser 33 go by line 39 past diagrammatically shown pressure release valve 40 to the bottom of a second reflux tower or fractionating tower 41. This tower 41 is similar in construction to tower 29 but not operating under pressure. It is also provided with a superimposed air tube fractionating condenser 42 similar to 33. Vapors go from 41 to 42 through line 43 and condensates in 42 are returned to the condenser 41 by line 44 provided with distributor 45. Heavy condensates from 41 are sent to the coils 46 in the cooling box through line 48, while vapors of lighter bodies pass through vapor line 49 leading from dephlegmator 42 to the coils 50 in the cooling box 47.

Oil from heat interchanger 29, this oil being both replenishing oil from 32 and condensates from reflux condensed 33, goes to exit through pipe 51 leading to the suction side of circulating pump 52. Connected to this pipe is pipe 53, valved for emergency use to cut off the chamber 23 in case the tubes fail. This line 53 withdraws oil from settling chamber 23 for re-circulation. On the discharge side, the pump is connected to pipe 54 leading back to the inlets 55 of the tube tiers in the heating furnace. Settlings and oil can be withdrawn from the bottom of the settling chamber by a special drain connection 56 provided with outlet 57 leading to pumps not shown. Ordinarily, however, I take these drainings through a tar cooler 58.

In the operation of the above apparatus, in starting, intermediate settling chamber or capacity tank 23 is partly filled with oil through 32; filling being to the desired level. This oil may be gas oil, kerosene, or any other oil which it is desirable to crack. Pump 52 is started into operation, withdrawing oil from this source through line 53 and delivering it by lines 55 to and through the various tiers of tubing in the combustion chambers. As stated, there are two sets of these tiers operating in parallel. The oil is heated and flows back to the settling chamber via line 22, and this operation is continued until the oil in the system is at the cracking and distilling temperature. With gas oil, pressure in the system may be maintained at about 125 pounds by means of valve 40. When distillation begins and oil vapors under pressure pass into the heat interchanger, a flow of replenishing or raw oil is sent into the system through pipe 32; this oil going through the heat interchanger and scrubbing the vapors and being heated on its way to pump 52. The hot vapors passing through the heat interchanger are freed to a large extent of heavy oils and excess heat. They ascend through pipe 35 to the reflux condenser 33 where they are further cooled by air passing through the pipes 34 and entering through louvres 36. Any condensate of relatively heavy oils formed in this reflux condenser flows back through 37 to distributor 38, whence it is sprayed downward through ascending vapors in the heat interchanger. Residual vapors leave through pipe 39, passing valve 40, where their pressure is dropped to atmospheric pressure. They then ascend through condenser 41. Any condensate here formed passes through line 48 and is cooled in coils 46 in cooling box 47. Lighter oils whose vapors resist condensation here ascend through pipe 43 to condenser 42, similar in design to 33. Condensate here formed flows through 44 to distributor 45 and joins the condensate in 41. Residual vapors pass through line 49 to condenser coil 50 in the cooling box.

As the operation goes on, the character of the oil in the lower part of the settling chamber 23 gradually changes by accumulation of coke particles and tar. From time to time or continuously, the settlings are taken out of this chamber through line 56, going while still hot through line 57 to a place of disposition or passing to tar cooler 58 through line 59. Withdrawal is so conducted as to prevent the layer of impure oil reaching the level of exit pipe 53 leading to the circulating system. The residual oil withdrawn with the settlings may be used as stock for re-running and producing more gas oil.

The pressure and temperature to which the oils are exposed in transit through the tubular heating system vary considerably as explained from point to point along its course; but are higher than those to which the major body of oil is subjected. The best temperatures and pressures for use in the chamber containing the major body of oil vary somewhat with the oil treated, being higher with comparatively low boiling oils, such as kerosene, than with higher boiling oils, such as gas oil. With gas oil distilling between 450 and 750° F., I ordinarily employ pressures of the order of about 125 pounds while with kerosene boiling between, say, 380 and 600°F., the pressures may advantageously go as high as 250 to 300 pounds. With a gas oil of 30 to 34 Bé. I ordinarily adjust conditions so that about 80 per cent of the vapors leaving the major body of oil are returned to it as reflux, leaving about 20 per cent to go forward to the condensing system. In so doing, the yields are ordinarily about 40 per cent (on the charged gas oil) of 54° Bé. naphtha from the light worm 50 and about 20 per cent of naphtha of 40° Bé. from the heavy worm 46.

What I claim is:—

1. The process of cracking oils which comprises establishing and maintaining a confined body of oil under heat and pressure, withdrawing vapors while under pressure from such body, releasing the pressure of said vapors and condensing them, replenishing the said confined body of oil by delivering replenishing oil to heating means and there heating it under pressure and passing it to said body at a point below the level thereof, while simultaneously permitting vapors from said heating means to mingle directly with the vapors above said confined body, and withdrawing liquid oil from said confined body and mingling it with said incoming replenishing oil in said heating means.

2. The process of treating oil which comprises forcibly circulating the oil to be cracked through a plurality of heated tubes to heat it to cracking temperature and under cracking pressure but at a rate preventing fargoing cracking, passing the products of said heating to a confined body of oil under conditions permitting delivery of liquid oil below the level of said confined body and vapors above the surface thereof, passing the so-delivered vapors and vapors arising from the said confined body of oil past pressure releasing means, and condensing said vapors.

3. The process of treating oil which comprises forcibly circulating the oil through a plurality of heated tubes to heat it to cracking temperature and under cracking pressure but at a rate preventing fargoing cracking, passing the products of said heating to a confined body of oil under conditions permitting delivery of liquid oil below the level of said confined body and vapors above the surface thereof, passing the so-delivered vapors and vapors arising from the said confined body of oil past pressure releasing means, condensing said vapors, and withdrawing liquid oil from said confined body and adding it to the oil undergoing heating in the plurality of tubes.

4. The process of treating petroleum oils which comprises forcibly circulating the oil through a plurality of heated tubes at cracking temperature and under cracking pressure but at a rate preventing fargoing cracking, passing the products of said heating to a confined body of oil under conditions permitting delivery of liquid oil below the level of the said body and vapors above the surface thereof, passing substantially all the said vapors and substantially all the vapors arising from said body of oil in contact with incoming oil to scrub said vapors and heat said incoming oil, passing the incoming oil together with all scrubbed out matters from the said vapors to the said tubes, releasing the pressure of the vapors passing the incoming oil and condensing the said vapors.

5. The process of treating oils which comprises forcibly circulating the oil through a plurality of heated tubes at cracking temperature and under cracking pressure but at a rate preventing fargoing cracking, passing the products of said heating to a confined body of oil under conditions permitting delivery of liquid oil below the level of the said body and vapors above the surface thereof, passing the said vapors and vapors arising from said body of oil in contact with incoming oil to scrub said vapors and heat said incoming oil, passing the incoming oil together with scrubbed out matters from said vapors to the said tubes, adding to said oil on its way to said tubes a portion of the oil of said confined body, and releasing the pressure of the vapors after said scrubbing and condensing therein.

6. The process of cracking petroleum oil which comprises establishing a confined body of such oil, passing a portion thereof through heating elements under cracking temperature and pressure but at a rate preventing fargoing cracking, returning the oil from said heating elements to said body under conditions permitting delivery of liquid oil below the level of the body and vapors above the surface thereof, the relative volume of the oil of said confined body being substantially greater at any given time than the volume of the oil in said heating elements, supplying incoming oil to said heating elements in admixture with the oil withdrawn from said confined body, subjecting the vapors from said confined body and any of the vapors passing the confined body from the heating element to reflux condensation, releasing the pressure of vapors from the reflux condensation and adding to the oil supplied to the heating elements liquid oil from the reflux condensation.

7. The process of cracking petroleum oil which comprises establishing and maintaining a large body of petroleum oil under cracking conditions of temperature, withdrawing a portion of said oil and passing it to heating elements, heating the said portion in said heating elements and delivering the liquid products of said heating below the liquid level of said body while delivering the vapors above the surface thereof, whereby partially cracked and uncracked oils are added to the said body and whereby heavy residual oil and carbon will settle toward the bottom thereof, withdrawing tar and heavy residual oils, and supplying incoming oil to the heating elements in admixture with oil withdrawn from said large body, and meantime passing the vapors from said large body past the incoming oil, releasing the pressure of the vapors passing the incoming oil and condensing the same.

8. Apparatus for cracking oils comprising a tubular heater, a capacity and quieting chamber, means for connecting the said tubular heater with said chamber, such means terminating at a low point in said chamber below the level of the oil therein at one end and at a relatively high point in said chamber above the oil therein at the other end, a heat interchanger in communication with said chamber for receiving vapors therefrom, means beyond the heat interchanger for maintaining pressure throughout the heat interchanger, the chamber and the tubular heater, means in communication with the heat interchanger for condensing vapors therefrom under atmospheric pressure, means for constantly withdrawing a relatively small portion of the oil from said chamber and forcibly circulating it through said tubular heater and means for delivering incoming oil to said tubular heater in admixture with oil withdrawn from said chamber.

9. In an oil cracking process in which a body of oil is heated and in which oil from said body is delivered to a separately maintained body of hot oil the step of supplying the oil from the heated body to the separately maintained hot body below the level of said hot body while supplying vapors from the heated oil above the level of said separately maintained hot body of oil.

10. The process of cracking petroleum oil which comprises establishing and maintaining a vertical column of a major body of such oil under cracking temperature and pressure, continuously removing a minor portion thereof from one point, forcibly circulating the said minor portion through heating means, delivering the products of the heating to the said major body at least in part at a point below the point of withdrawal of the minor portion under conditions allowing carbon, tar and heavy residual oil to settle, withdrawing carbon, tar and heavy residual oil from a point of said major body lower than the point of delivering of the said minor portion, partially condensing the vapors from said major body, finally condensing uncondensed vapors, and supplying to the heating means in admixture with the minor portion of oil withdrawn from the major body replenishing oil which has scrubbed the vapors from the said major body of oil.

11. The process of treating oil which comprises forcibly circulating the oil to be cracked through a plurality of heated tubes to heat it under pressure to cracking temperature but at a rate to prevent far-going cracking, passing the products of said heating to a confined body of oil under conditions permitting delivery of liquid oil below the level of said confined body and vapors above the surface thereof, removing the so delivered vapors and vapors arising from the said confined body of oil and condensing said vapors without further contact of said vapors with the oil which has comprised said confined body.

12. In an oil cracking process in which a body of oil is heated and in which oil from said body is delivered to a separately maintained body of hot oil, the step of supplying the oil from the heated body to the separately maintained hot body below the level of said hot body while supplying vapors from the heated body above the level of said separately maintained hot body of oil, removing all vapors from the presence of said body of hot oil, and condensing these vapors under pressure without further contacting said vapors with the oil which has comprised the said body of hot oil.

In testimony whereof, I have hereunto affixed my signature.

CHARLES B. BUERGER.